(12) United States Patent
Majumder

(10) Patent No.: US 11,777,312 B2
(45) Date of Patent: Oct. 3, 2023

(54) POWER DISTRIBUTION ARRANGEMENT

(71) Applicant: Hitachi Energy Switzerland AG, Baden (CH)

(72) Inventor: Ritwik Majumder, Västerås (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 18/020,043

(22) PCT Filed: Aug. 7, 2020

(86) PCT No.: PCT/EP2020/072321
§ 371 (c)(1),
(2) Date: Feb. 6, 2023

(87) PCT Pub. No.: WO2022/028720
PCT Pub. Date: Feb. 10, 2022

(65) Prior Publication Data
US 2023/0231380 A1     Jul. 20, 2023

(51) Int. Cl.
*H02J 3/00*     (2006.01)
*H02J 3/02*     (2006.01)

(52) U.S. Cl.
CPC .............. *H02J 3/0073* (2020.01); *H02J 3/02* (2013.01)

(58) Field of Classification Search
None
See application file for complete search history.

(56) References Cited

U.S. PATENT DOCUMENTS

| 10,198,018 | B2 * | 2/2019 | Gan | H02J 13/00002 |
| 2012/0065804 | A1 | 3/2012 | Biswal et al. | |
| 2013/0015703 | A1 | 1/2013 | Rouse et al. | |
| 2013/0024033 | A1 | 1/2013 | Fan et al. | |
| 2016/0322827 | A1 * | 11/2016 | Gupta | H02J 3/381 |
| 2018/0316188 | A1 * | 11/2018 | Ishchenko | H02H 7/262 |

FOREIGN PATENT DOCUMENTS

CN     104063508 A     9/2014

OTHER PUBLICATIONS

International Search Report and Written Opinion of the International Searching Authority for the corresponding International Application PCT/EP2020/072321 dated Mar. 1, 2021, 16 pages.

* cited by examiner

*Primary Examiner* — Jared Fureman
*Assistant Examiner* — Aqeel H Bukhari
(74) *Attorney, Agent, or Firm* — Procopio, Cory, Hargreaves & Savitch LLP

(57) ABSTRACT

A power distribution arrangement for distributing AC power to loads requiring AC power is disclosed. The power distribution arrangement comprises a power distribution substation comprising transformers, switches, buses, and feeders, a DC transmission line, and at least one control unit. The control unit may control operation of the switches to selectively connect or disconnect one or more feeders to or from at least one transformer via one or more buses and to selectively connect or disconnect the DC transmission line to or from one or more feeders via at least one bus, whereby AC power is distributed to the loads via the feeders. The control unit may control operation of the switches based on: loading in and a power transfer rating of respective feeders and transformers, and any power transfer via the DC transmission line from the other power distribution substation to the at least one bus.

20 Claims, 6 Drawing Sheets

POWER DISTRIBUTION ARRANGEMENT

CROSS-REFERENCE TO RELATED APPLICATIONS

The present application is a national stage entry of International Patent Application No. PCT/EP2020/072321, filed on Aug. 7, 2020, which is hereby incorporated herein by reference as if set forth in full.

TECHNICAL FIELD

The present disclosure relates to a power distribution arrangement for distributing alternating current (AC) power to a plurality of loads requiring AC power, and a method in such a power distribution arrangement.

BACKGROUND

An electrical power distribution system may employ connection schemes or topologies of so called feeders for connecting one or more electrical substations to one or more areas which may include a plurality of consumers of power. The feeders may be referred to as distribution feeders. The electrical substation(s), which in the following may be referred to simply as substation(s), may change the voltage level by decreasing the voltage level. The substation(s) may for example change the voltage level from a relatively high transmission voltage level, used in an electrical power transmission system connected to the electrical power distribution system, to a relatively medium or low distribution voltage level, used in the electrical power distribution system. The substation(s) may provide further functionality in addition to changing voltage level. The feeders may connect transformers, e.g., distribution transformers, in the substation(s) with the one or more areas or consumers of power, for distribution of power from the substation(s) to the one or more areas or consumers of power. Each or any of the feeders may for example comprise one or more overhead lines and/or cables. The loading in a feeder may vary with time. The variation of loading in a feeder with time may depend on variation in power requirement of one or more areas or consumers of power to which the feeder is connected. The variation of loading in a feeder with time may also depend on the type of load the one or more areas or consumers of power comprise or constitute — for example residential load, commercial load, or industrial load. Each feeder may have a certain power transfer rating, which may be defined as the highest allowed power transfer level in the feeder.

SUMMARY

In an electrical power distribution arrangement there may be a plurality of feeders for connecting a substation to one or more geographical areas to which alternating current (AC) power is distributed, which one or more geographical areas may include a plurality of consumers of power. The substation may include one or more transformers, each of which may be selectively and controllably connectable to at least one power source providing AC power. The one or more geographical areas or the consumers of power may be referred to as a plurality loads, each of which may require AC power. Each of the feeders may be selectively and controllably connectable to at least one of the loads and to at least one of the transformers, respectively, via one or more buses (or busbars, bus sections, or bus parts). By means of switches, one or more of the feeders may be selectively and controllably connected or disconnected to or from the one or more of the buses in order to connect or disconnect the one or more feeders to or from at least one of the transformers. Thereby, AC power can be distributed to the loads via the feeders. The loading in the feeders may be changing continuously, and based on the loading in the feeders, switches may be opened and closed to achieve different loading at the transformers. The switches may for example be opened and closed such that loading in the respective ones of the transformers becomes more balanced between the transformers. Such opening and closing of the switches—in order to connect or disconnect one or more feeders to or from the transformers—may in the context of the present application be referred to as feeder reconfiguration (or feeder configuration, depending on when the opening and closing of the switches is carried out). By providing a relatively large number of buses and switches—in comparison to the number of transformers and feeders—and configuring the connections between the transformers and feeders via the buses and switches to allow for many different ways of connecting different feeders with different transformers—a relatively high flexibility in feeder reconfiguration may be achieved. However, at least in some applications an even higher flexibility in feeder reconfiguration may be desired or even required.

In view of the foregoing, a concern of the present disclosure is to provide a power distribution arrangement for distributing alternating current AC power to a plurality of loads requiring AC power, which power distribution arrangement employ feeders, and which power distribution arrangement may allow for a relatively high flexibility in feeder reconfiguration.

To address at least one of this concern and other concerns, a power distribution arrangement and a method in a power distribution arrangement in accordance with the independent claims are provided. Preferred embodiments are defined by the dependent claims.

According to a first aspect of the present disclosure, a power distribution arrangement is provided. The power distribution arrangement is for distributing AC power to a plurality of loads requiring AC power. The AC power requirement of any load may vary with time. The power distribution arrangement comprises a substation, e.g., a power distribution substation, comprising a plurality of transformers. Each of the transformers is selectively and controllably connectable to at least one power source providing AC power. The power distribution arrangement comprises a plurality of switches, a plurality of buses (or busbars, bus sections, or bus parts), and a plurality of feeders. Each of the feeders is selectively and controllably connectable to at least one of the loads and to at least one of the transformers, respectively, via one or more of the buses. At least some of the switches are configured to selectively and controllably connect or disconnect one or more of the feeders to or from the one or more of the buses in order to connect or disconnect the one or more feeders to or from at least one of the transformers. The power distribution arrangement comprises a direct current (DC) transmission line. The DC transmission line is at one end thereof selectively and controllably connectable to the respective ones of the feeders via at least one bus, via a converter configured to convert DC power to AC power, or vice versa. The DC transmission line is at another (or the other) end thereof connected or connectable to another substation, e.g., another power distribution substation. At least one of the switches is configured to selectively and controllably connect or disconnect the DC transmission line to or from the at least one bus in order to connect or disconnect the DC transmission line to or from the feeders. The power distribution arrangement comprises at least one control unit. The at least one control unit may be communicatively connected with the DC transmission line. The at least one control unit is configured to control any power transfer via the DC transmission line from the other power distribution substation to the at least one bus. The at least one control unit may be communicatively connected with the transformers, the feeders and the switches. The at least one control unit is configured to control operation of the switches in order to selectively connect or disconnect one or more of the feeders to or from at least one of the transformers via one or more of the buses and to selectively connect or disconnect the DC transmission line to or from one or more of the feeders via the at least one bus. Thereby, AC power is distributed to the loads via the feeders. The at least one control unit is configured to control the operation of the switches based on: loading in and a power transfer rating of the respective ones of the feeders, loading in and a power transfer rating of the respective ones of the transformers, and any power transfer via the DC transmission line from the other power distribution substation to the at least one bus.

By the providing of the DC transmission line, which at one end thereof is selectively and controllably connectable to the respective ones of the feeders via at least one bus, and by the at least one control unit being configured to control operation of the switches in order to selectively connect or disconnect one or more of the feeders to or from at least one of the transformers via one or more of the buses and to selectively connect or disconnect the DC transmission line to or from one or more of the feeders via the at least one bus, feeder reconfiguration can be carried out while utilizing or taking into account any power transfer via the DC transmission line from the other power distribution substation to the at least one bus. By providing additional power transfer capability via the DC transmission line, in addition to power transfer capability from the power sources providing AC power via the transformers, an increased flexibility in feeder reconfiguration may be achieved. For example, an operator of the power distribution arrangement, or of a power distribution system of which the power distribution arrangement may be a part of, can utilize the power transfer capability via the DC transmission line in order to be more flexible in reconfiguration of feeders.

Reconfiguration of the feeders may be initiated by an operator, or based on occurrence of a predefined type of event, such as, for example, that it is sensed that a fault is occurring in the DC transmission line, and/or that it is sensed that there is an overload in one or more of the transformers (e.g., if the loading in one or more of the transformers exceed the power transfer ratings of the respective ones of that or those transformers). Such sensing may be for example be carried out by some component that is configured to monitor the state of the power distribution arrangement or a power distribution system of which the power distribution arrangement may be a part. The component may for example comprise a fault protection or detection unit which may be configured to monitor transmission lines in the power distribution arrangement or in a power distribution system of which the power distribution arrangement may be a part of and sense whether any fault occurs in the transmission lines.

By carrying out feeder reconfiguration while utilizing or taking into account any power transfer via the DC transmission line from the other power distribution substation to the at least one bus, the power transfer reliability to the loads may become relatively high. Further, it may allow for or enable for increasing the power transfer to one or more of the loads (e.g., as a result in increased power demand at the load(s)) without or with only relatively small investments in transformer and feeder capacity (e.g., to increase their power transfer ratings) being required.

The providing of the DC transmission line and any required switch(es) and bus(es) may require relatively little changes in an existing power distribution arrangement employing feeders. The DC transmission line may for example comprise or be constituted by a Medium Voltage DC (MVDC) transmission line, which may be referred to as an MVDC link.

The power distribution arrangement may comprise at least two control units, such as, for example, a first control unit and a second control unit. The at least two control units may be communicatively coupled with each other. For example, the first control unit may be a control unit of the, or relating to, the DC transmission line, and may be referred to as a DC transmission line control unit or controller, or a MVDC link controller. The first control unit may be communicatively connected with the DC transmission line. The first control unit may be configured to control any power transfer via the DC transmission line from the other power distribution substation to the at least one bus. For example, the second control unit may be a control unit of the, or relating to, the switches and/or the power distribution substation, and may be referred to as a power distribution substation control unit or controller. The second control unit may be communicatively connected with the transformers, the feeders and the switches. The second control unit may be configured to control the operation of the switches. Such a first control unit and a second control unit will be described further in the following. Possibly, the respective controlling capabilities of the first control unit and the second control unit may be realized in or implemented by a single control unit.

Each or any of the switches in the power distribution arrangement may for example comprise one or more so called transfer switches and/or circuit breakers. The one or more circuit breakers may for example comprise one or more sulfur hexafluoride ($SF_6$) high-voltage circuit breakers and/or carbon dioxide ($CO_2$) high-voltage circuit breakers.

The at least one power source providing AC power may for example comprise or be constituted by a power system, or a part of a power system. For example, each of the transformers may be selectively and controllably connectable to a power system providing AC power.

In the context of the present application, by a plurality loads requiring AC power, it may be meant a plurality of geographical areas to which AC power is distributed, or a plurality of consumers of AC power (which consumers may or may not be located in respective ones of the plurality of geographical areas).

In the context of the present application, by a feeder it is meant a conducting device, element, component, etc., such as one or more transmission lines, which connect(s) a substation with one or more loads for distribution or transfer of power to the one or more loads from the substation. A feeder, e.g., comprising one or more transmission lines, may for example comprise one or more overhead lines and/or cables.

In the context of the present application, by a power transfer rating of a component, such as any of the feeders, any of the transformers, or the DC transmission line, it may be meant the highest allowed power transfer level in the component.

The power distribution arrangement may comprise at least one sensor, which may be configured to sense one or more properties or characteristics of one or more of the components of the power distribution arrangement. The at least one sensor may for example be configured to sense loading in each or any of the transformers, and/or sense loading in each or any of the feeders or in a part or segment of each or any of the feeders. The at least one control unit may be communicatively connected with the at least one sensor. Thereby, the at least one control unit may be configured to receive sensor data (e.g., data indicative of one or more properties or characteristics sensed by the at least one sensor).

In order to provide additional power transfer capability, the power distribution arrangement may comprise more than one DC transmission line. Each of the DC transmission lines may at one end thereof be selectively and controllably connectable to the respective ones of the feeders via at least one bus, via a converter configured to convert DC power to AC power, or vice versa. The DC transmission lines may at another (or the other) end thereof be connected or connectable to other substations, e.g., other power distribution substations. At least one of the switches may be configured to selectively and controllably connect or disconnect each of the DC transmission lines to or from the at least one bus in order to connect or disconnect the DC transmission line to or from the feeders. The at least one control unit may be configured to control the operation of the switches based on: loading in and a power transfer rating of the respective ones of the feeders, loading in and a power transfer rating of the respective ones of the transformers, and any power transfer via each of the DC transmission lines from the respective ones of the other power distribution substations to the at least one bus.

According to a second aspect of the present disclosure, a method in a power distribution arrangement is provided. The method is for distributing AC power to a plurality of loads requiring AC power. The power distribution arrangement comprises a power distribution substation comprising a plurality of transformers. Each of the transformers is selectively and controllably connectable to at least one power source providing AC power. The power distribution arrangement comprises a plurality of switches, a plurality of buses, and a plurality of feeders. Each of the feeders is selectively and controllably connectable to at least one of the loads and to at least one of the transformers, respectively, via one or more of the buses. At least some of the switches are configured to selectively and controllably connect or disconnect one or more of the feeders to or from the one or more of the buses in order to connect or disconnect the one or more feeders to or from at least one of the transformers. The power distribution arrangement comprises a DC transmission line. The DC transmission line is at one end thereof selectively and controllably connectable to the respective ones of the feeders via at least one bus, via a converter configured to convert DC power to AC power, or vice versa. The DC transmission line is at another (or the other) end thereof connected or connectable to another power distribution substation. At least one of the switches is configured to selectively and controllably connect or disconnect the DC transmission line to or from the at least one bus in order to connect or disconnect the DC transmission line to or from the feeders.

The method according to the second aspect of the present disclosure comprises controlling any power transfer via the DC transmission line from the other power distribution substation to the at least one bus. The method according to the second aspect of the present disclosure comprises controlling operation of the switches to selectively connect or disconnect one or more of the feeders to or from at least one of the transformers via one or more of the buses and to selectively connect or disconnect the DC transmission line to or from one or more of the feeders via the at least one bus. Thereby, AC power is distributed to the loads via the feeders. The controlling of the operation of the switches is based on: loading in and a power transfer rating of the respective ones of the feeders, loading in and a power transfer rating of the respective ones of the transformers, and any power transfer via the DC transmission line from the other power distribution substation to the at least one bus.

According to a third aspect of the present disclosure, a control unit for a power distribution arrangement is provided. The control unit comprises a processor configured to carry out the method according to the second aspect of the present disclosure. The control unit may be a control unit in a power distribution arrangement according to the first aspect of the present disclosure.

The control unit according to the third aspect of the present disclosure or any control unit in the power distribution arrangement according to the first aspect of the present disclosure may for example include or be constituted by any suitable central processing unit (CPU), microcontroller, digital signal processor (DSP), Application Specific Integrated Circuit (ASIC), Field Programmable Gate Array (FPGA), etc., or any combination thereof The control unit according to the third aspect of the present disclosure or any control unit in the power distribution arrangement according to the first aspect of the present disclosure may optionally be capable of executing software instructions stored in a computer program product e.g. in the form of a memory. The memory may for example be any combination of read and write memory (RAM) and read only memory (ROM). The memory may comprise persistent storage, which for example can be a magnetic memory, an optical memory, a solid state memory or a remotely mounted memory, or any combination thereof.

According to a fourth aspect of the present disclosure, a computer program is provided. The computer program comprises instructions, which when executed by one or more processors comprised in at least one control unit, cause the at least one control unit to perform the method according to the second aspect of the present disclosure.

According to a fifth aspect of the present disclosure, a processor-readable medium is provided. The processor-readable medium has a computer program loaded thereon, wherein the computer program comprises instructions, which, when executed by one or more processors comprised in at least one control unit, cause the at least one control unit to perform the method according to the second aspect of the present disclosure.

Further objects and advantages of the present disclosure are described in the following by means of exemplifying embodiments. It is noted that the present disclosure relates to all possible combinations of features recited in the claims. Further features of, and advantages with, the present disclosure will become apparent when studying the appended claims and the description herein. Those skilled in the art realize that different features of the present disclosure can be combined to create embodiments other than those described herein.

BRIEF DESCRIPTION OF THE DRAWINGS

Exemplifying embodiments of the present disclosure will be described below with reference to the accompanying drawings.

Each of FIGS. 1 to 5 is a schematic view of a power distribution arrangement according to one or more embodiments.

All the figures are schematic, not necessarily to scale, and generally only show parts which are necessary in order to elucidate embodiments of the present disclosure, wherein other parts may be omitted or merely suggested.

DETAILED DESCRIPTION

Embodiments will now be described hereinafter with reference to the accompanying drawings, in which exemplifying embodiments of the present disclosure are shown. The present disclosure may, however, be embodied in many different forms and should not be construed as limited to the embodiments of the present disclosure set forth herein; rather, these embodiments are provided by way of example so that this disclosure will convey its scope to those skilled in the art.

Figure 1:
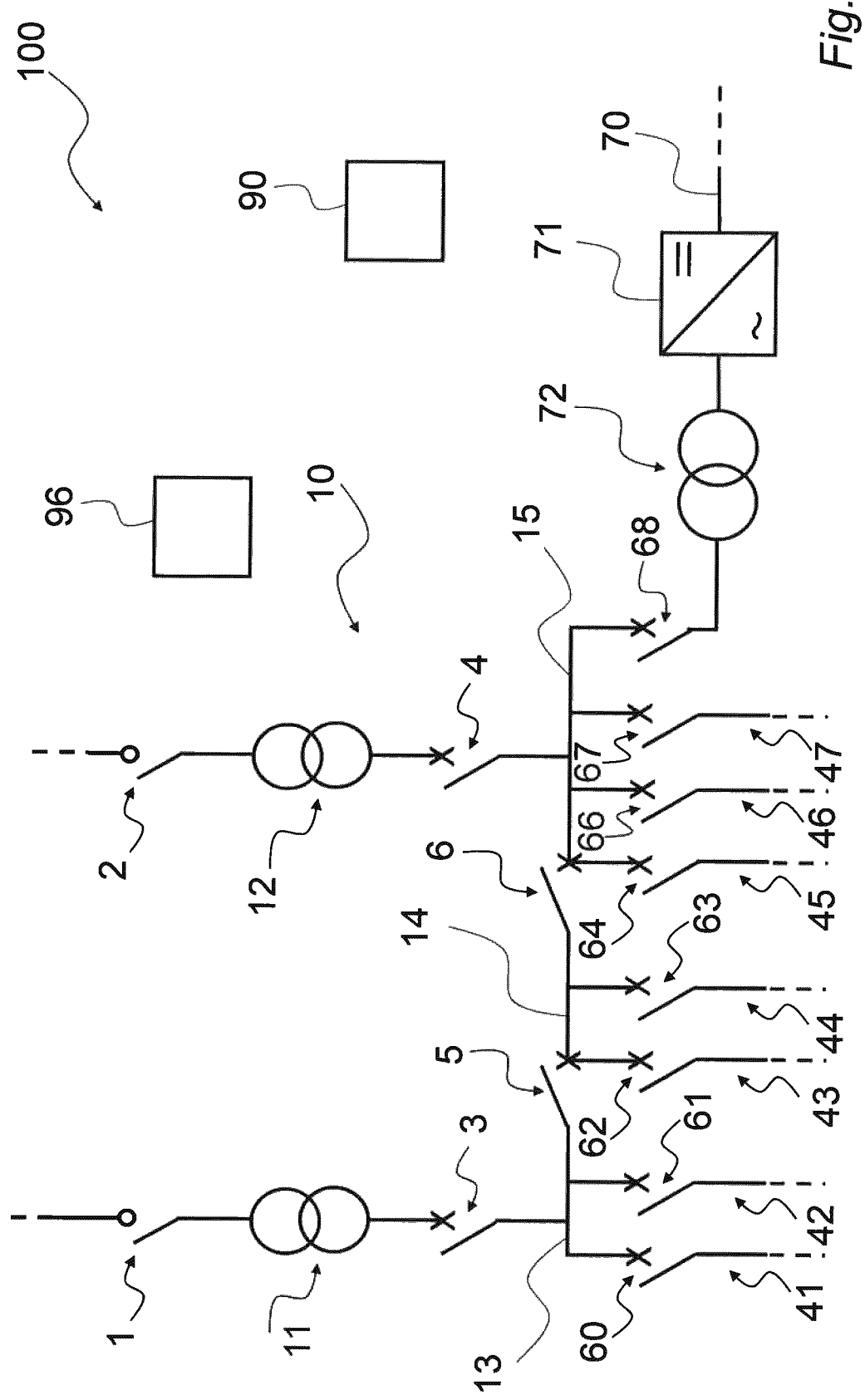

FIG. 1 is a schematic view of a power distribution arrangement 100 according to one or more embodiments. The power distribution arrangement 100 is for distributing alternating current (AC) power to a plurality of loads (not shown in FIG. 1) requiring AC power. The AC power requirement of any load may vary with time.

The power distribution arrangement 100 comprises a substation 10, e.g., a power distribution substation. The substation 10 comprises a plurality of transformers. In accordance with the embodiment illustrated in FIG. 1, the substation 10 comprises two transformers 11, 12. However, it is to be understood that the substation 10 may comprise more than two transformers.

The power distribution arrangement 100 comprises a plurality of switches. In accordance with the embodiment illustrated in FIG. 1, the power distribution arrangement 100 comprises switches 1-6 and 60-68. It is to be understood that the number of switches may be smaller or larger than illustrated in FIG. 1.

Each of the transformers 11, 12 is selectively and controllably connectable to at least one power source providing AC power (not shown in FIG. 1). As indicated in FIG. 1, each of the transformers 11, 12 is selectively and controllably connectable to at least one power source by means of the switches 1 and 2, respectively.

The power distribution arrangement 100 comprises a plurality of buses (or bus sections, busbars, or bus parts). In accordance with the embodiment illustrated in FIG. 1, the power distribution arrangement 100 comprises three buses 15, 16, 17. However, it is to be understood that the power distribution arrangement 100 may comprise more or less buses than three.

The power distribution arrangement 100 comprises a plurality of feeders. In accordance with the embodiment illustrated in FIG. 1, the power distribution arrangement 100 comprises feeders 41-47. It is to be understood that the number of feeders may be smaller or larger than illustrated in FIG. 1.

Generally, each of the feeders is selectively and controllably connectable to at least one of the loads and to at least one of the transformers, respectively, via one or more of the buses of the power distribution arrangement, by means of at least some of the switches of the power distribution arrangement.

Each of the feeders 41-47 is selectively and controllably connectable to at least one of the loads. Each of the ends of the feeders 41-47 with dashed lines is connected to one or more of the loads (not shown in FIG. 1).

As illustrated in FIG. 1, each of the feeders 41-47 is selectively and controllably connectable to at least one of the loads and to at least one of the transformers 11, 12, respectively, via one or more of the buses 13, 14, 15. The switches 3-6 and 60-67 are configured to selectively and controllably connect or disconnect one or more of the feeders 41-47 to or from the one or more of the buses 13, 14, 15 in order to connect or disconnect the one or more feeders 41-47 to or from at least one of the transformers 11, 12.

For example, the switches 1, 2, 3, 4 and 5 may be normally-closed switches, and the switch 6 may be a normally-open switch.

As illustrated in FIG. 1, the feeders 43 and 44 may be connected to either the transformer 11 or the transformer 12 or to both of the transformers 11 and 12 depending on whether the respective ones of the switches 3, 4, 5 and 6 are open or closed.

The power distribution arrangement 100 comprises a direct current (DC) transmission line 70. The DC transmission line 70 is at one end thereof selectively and controllably connectable to the respective ones of the feeders 41-47 via at least one bus, via a converter 71 configured to convert DC power to AC power, or vice versa. As illustrated in FIG. 1, in accordance with the illustrated embodiment, the DC transmission line 70 is at one end thereof selectively and controllably connectable to at least the feeders 45-47 via the bus 15. The DC transmission line 70 may for example comprise or be constituted by a Medium Voltage DC (MVDC) transmission line, which may be referred to as an MVDC link.

It is to be understood that the DC transmission line 70 could be selectively and controllably connectable to at least some of the feeders via more than one bus. Further, the DC transmission line 70 may be connected or connectable between different buses (or bus sections) of the power distribution arrangement 100. These aspects relating to the DC transmission line 70 may be applied or implemented in any one of the embodiments disclosed herein.

The DC transmission line 70 is at the other end thereof connected or connectable to another substation, e.g., another power distribution substation (not shown in FIG. 1).

Generally, at least one of the switches is configured to selectively and controllably connect or disconnect the DC transmission line 70 to or from the at least one bus in order to connect or disconnect the DC transmission line 70 to or from the feeders 41-47. As illustrated in FIG. 1, in accordance with the illustrated embodiment, the switch 68 is configured to selectively and controllably connect or disconnect the DC transmission line 70 to or from the bus 15 in order to connect or disconnect the DC transmission line 70 to or from the feeders 41-47.

Further in accordance with the illustrated embodiment, a transformer 72 is connected between the converter 71 and the switch 68. The transformer 72 may be omitted.

Generally, at least some of the feeders may be selectively and controllably connectable to at least one of the transformers by means of a plurality of buses connected or connectable in series. The DC transmission line may be selectively and controllably connectable to at least one of the buses that are connected or connectable in series. In accordance with the embodiment illustrated in FIG. 1, the buses 15, 16, 17 are connected or connectable in series, and the DC transmission line 70 is selectively and controllably connected or connectable to the bus 15.

It is to be understood that the configuration (e.g., interconnections) of feeders, buses and switches illustrated in FIG. 1 is according to an example and for illustrating principles of one or more embodiments. The configuration (e.g., interconnections) of feeders, buses and switches could be different, for example such as illustrated in any one of FIGS. 2 to 5.

The power distribution arrangement 100 comprises a first control unit 90. The first control unit 90 may be communicatively connected with the DC transmission line 70. The first control unit 90 is configured to control any power transfer via the DC transmission line 70 from the other power distribution substation to the at least one bus. To that end, the first control unit 90 may be communicatively connected with the converter 71. The first control unit 90 may be a control unit of the, or relating to, the DC transmission line 70, and may be referred to as a DC transmission line control unit or controller.

In the context of the present application, by a first component being communicatively connected with a second component (e.g., the first control unit 90 being communicatively connected with the DC transmission line 70 or the converter 71), it is meant that the components are able to communicate via wired and/or wireless communication means or techniques, for example via any appropriate wired and/or wireless communication means or techniques as known in the art, for transmitting messages, instructions, data, commands, etc., from the first component to the second component and possibly also vice versa. Wired communication means may for example comprise radio frequency (RF) communication, infrared communication (e.g., employing a communication link employing infrared light) or another type of free-space optical communication. Wireless communication means may for example comprise at least one optical waveguide, or optical transmission line (e.g., an optical fiber), and/or at least one electrical conductor (e.g., a cable or wire, e.g., a copper conductor or cable, or copper wire).

The power distribution arrangement 100 comprises a second control unit 96.

The second control unit 96 may be communicatively connected with the first control unit 90, the transformers 11, 12, the feeders 41-47 and at least some of the switches 1-6 and 60-68.

The power distribution arrangement 100 may comprise at least one sensor (not shown in FIG. 1), which for example may be configured to sense loading in each or any of the transformers 11, 12, and/or sense loading in each or any of the feeders 41-47 or in a part or segment of each or any of the feeders 41-47. The second control unit 96 may be communicatively connected with the at least one sensor. Thereby, the second control unit 96 may be configured to receive sensor data (e.g., data indicative of one or more properties or characteristics sensed by the at least one sensor, such as loading in each or any of the transformers 11, 12 and in each or any of the feeders 41-47 or in a part or segment of each or any of the feeders 41-47. Such at least one sensor may be applied or included in any one of the embodiments disclosed herein.

The second control unit 96 is configured to control operation of at least some of the switches 1-6 and 60-68 in order to selectively connect or disconnect one or more of the feeders 41-47 to or from at least one of the transformers 11, 12 via one or more of the buses 13-15 and to selectively connect or disconnect the DC transmission line 70 to or from one or more of the feeders 41-47 via the at least one bus (e.g., the bus 15). Thereby, AC power is distributed to the loads via the feeders 41-47. The second control unit 96 is configured to control the operation of the switches based on: loading in and a power transfer rating of the respective ones of the feeders 41-47, loading in and a power transfer rating of the respective ones of the transformers 11, 12, and any power transfer via the DC transmission line 70 from the other power distribution substation to the at least one bus (e.g., the bus 15).

The second control unit 96 may be a control unit of the, or relating to, the switches and/or the power distribution substation 10, and may be referred to as a power distribution substation control unit or controller.

Even if the first control unit 90 and the second control unit 96 are described herein as separate control units, the respective controlling capabilities of the first control unit 90 and the second control unit 96 might be realized or implemented by a single control unit.

The second control unit 96 may be configured to receive, possibly continually or continuously, data or information regarding loading in the feeders 41-47 and loading in the transformers 11, 12 from another entity (not shown in FIG. 1), which for example may comprise another control unit or a controller, or a sensor. The sensor, which may be comprised in the power distribution arrangement 100, may be configured to sense loading in each or any of the transformers 11, 12, and/or sense loading in each or any of the feeders 41-47. The second control unit 96 may be communicatively connected with the sensor or other entity for receiving, possibly continually or continuously, data or information regarding loading in the feeders 41-47 and loading in the transformers 11, 12.

Further to the foregoing description, by providing additional power transfer capability via the DC transmission line 70, in addition to power transfer capability from the power sources providing AC power via the transformers 11, 12, an increased flexibility in feeder reconfiguration may be achieved. For example, an operator of the power distribution arrangement 100, or of a power distribution system of which the power distribution arrangement 100 may be a part of, can utilize the power transfer capability via the DC transmission line 70 in order to be more flexible in reconfiguration of the feeders 41-47.

The second control unit 96 may be configured to control the operation of at least some of the switches 1-6 and 60-68 such that loading in the respective ones of the transformers 11, 12 becomes more balanced between the transformers 11, 12. For example, the second control unit 96 may be configured to compare loadings in the feeders 41-47 with the power transfer ratings of the respective ones of the feeders 41-47, and further to compare loadings in the transformers 11, 12 with the power transfer ratings of the respective ones of the transformers 11, 12, and further to control the operation of the switches based on the comparisons such that loading in the respective ones of the transformers 11, 12 becomes more balanced between the transformers 11, 12. Such control of the operation of the switches may be applied in any one of the embodiments disclosed herein.

The first control unit 90 may be configured to control any power transfer via the DC transmission line 70 from the other power distribution substation (not shown in FIG. 1) to the at least one bus (e.g., the bus 15) based on a selected power transfer reference value, or power transfer setpoint. The second control unit 96 may be configured to control the operation of the switches further based on the power transfer reference value, and possibly also based on a power transfer rating of the DC transmission line 70. The first control unit 90 and/or the second control unit 96 may be communicatively connected with another control unit (not shown in FIG. 1) which may be associated with the other power distribution substation (also not shown in FIG. 1). The other control unit may be configured to control operation of the other power distribution substation. The first control unit 90 and/or the second control unit 96 may be configured to receive an indication of the selected power transfer reference value from the other control unit. Such control of the operation of the switches may be applied in any one of the embodiments disclosed herein. The indication of the selected power transfer reference value from the other control unit may be constituted by a request for a certain power transfer reference value from the other control unit, to be used for controlling power transfer via the DC transmission line 70 from the other power distribution substation to the at least one bus (e.g., the bus 15) by the first control unit 90.

The second control unit 96 may be configured to control the operation of the switches to selectively connect or disconnect the DC transmission line 70 to or from one or more of the feeders 41-47 via the at least one bus (e.g., the bus 15) further based on an indication whether there is a fault occurring in the DC transmission line 70. The second control unit 96 may be configured to receive an indication whether there is a fault occurring in the DC transmission line 70 from a fault protection or detection unit (not shown in FIG. 1) which may be configured to monitor transmission lines, e.g., in the power distribution arrangement 100, or in a power distribution system of which the power distribution arrangement 100 may be a part of for occurrence of faults. In the event of a fault occurring in a transmission line, the fault protection unit may trip, or open, circuit breakers located at each end of the transmission line may be tripped, or opened, in order to disconnect the transmission line in which a fault occurs from other parts the power distribution arrangement 100 or the power distribution system. Such fault protection or detection units are known in the art. In overhead lines, a majority of the faults which may occur are temporary or transient faults, and may for example be due to lightning strike and/or flashover. In cables, virtually all of the faults that may occur may be permanent faults, which for example may be due to a short-circuit between conductors. On a condition that there is a fault occurring in the DC transmission line 70, the second control unit 96 may be configured to disconnect the DC transmission line 70 from the at least one bus (e.g., the bus 15). On a condition that there is no fault occurring in the DC transmission line 70, the second control unit 96 may be configured to selectively connect or disconnect the DC transmission line 70 to or from one or more of the feeders 41-47 via the at least one bus (e.g., the bus 15). Such control based on an indication whether there is a fault occurring in the DC transmission line 70 may be applied in any one of the embodiments disclosed herein.

The loading in one or more of the transformers 11, 12 may exceed the power transfer ratings of the respective ones of that or those transformers 11, 12, such that that or those transformers 11, 12 are overloaded. In that event, the second control unit 96 may be configured to control the operation of the switches so as to disconnect one or more of the feeders 41-47 from the overloaded transformer(s) 11, 12 via one or more of the buses and connect that or those feeders to one or more transformers 11, 12 that are not overloaded (if such is/are available) via one or more of the buses and/or connecting the DC transmission line 70 to that or those feeders via the at least one bus (e.g., the bus 15). Such control of the operation of the switches may be applied in any one of the embodiments disclosed herein.

The first control unit 90 may be configured to control any power transfer via the DC transmission line 70 from the at least one bus (e.g., the bus 15) to the other power distribution substation. The first control unit 90 and/or the second control unit 96 may be configured to determine, based on the loading in and the power transfer rating of the respective ones of the feeders 41-47 and the loading in and the power transfer rating of the respective ones of the transformers 11, 12, whether there is a deficit in available power from the transformers 11, 12, so that there is need for power to be transferred via the DC transmission line 70 from the other power distribution substation to the at least one bus (e.g., the bus 15), or if there is a surplus in available power from the transformers 11, 12, so that power can be transferred via the DC transmission line 70 from the at least one bus to the other power distribution substation. The first control unit 90 may be configured to, based on the deficit or the surplus in available power from the transformers 11, 12, control transfer of power via the DC transmission line 70 to transfer power from the other power distribution substation to the at least one bus or to transfer power from the at least one bus to the other power distribution substation. Such control of transfer of power via the DC transmission line 70 may be applied in any one of the embodiments disclosed herein.

Figure 2:
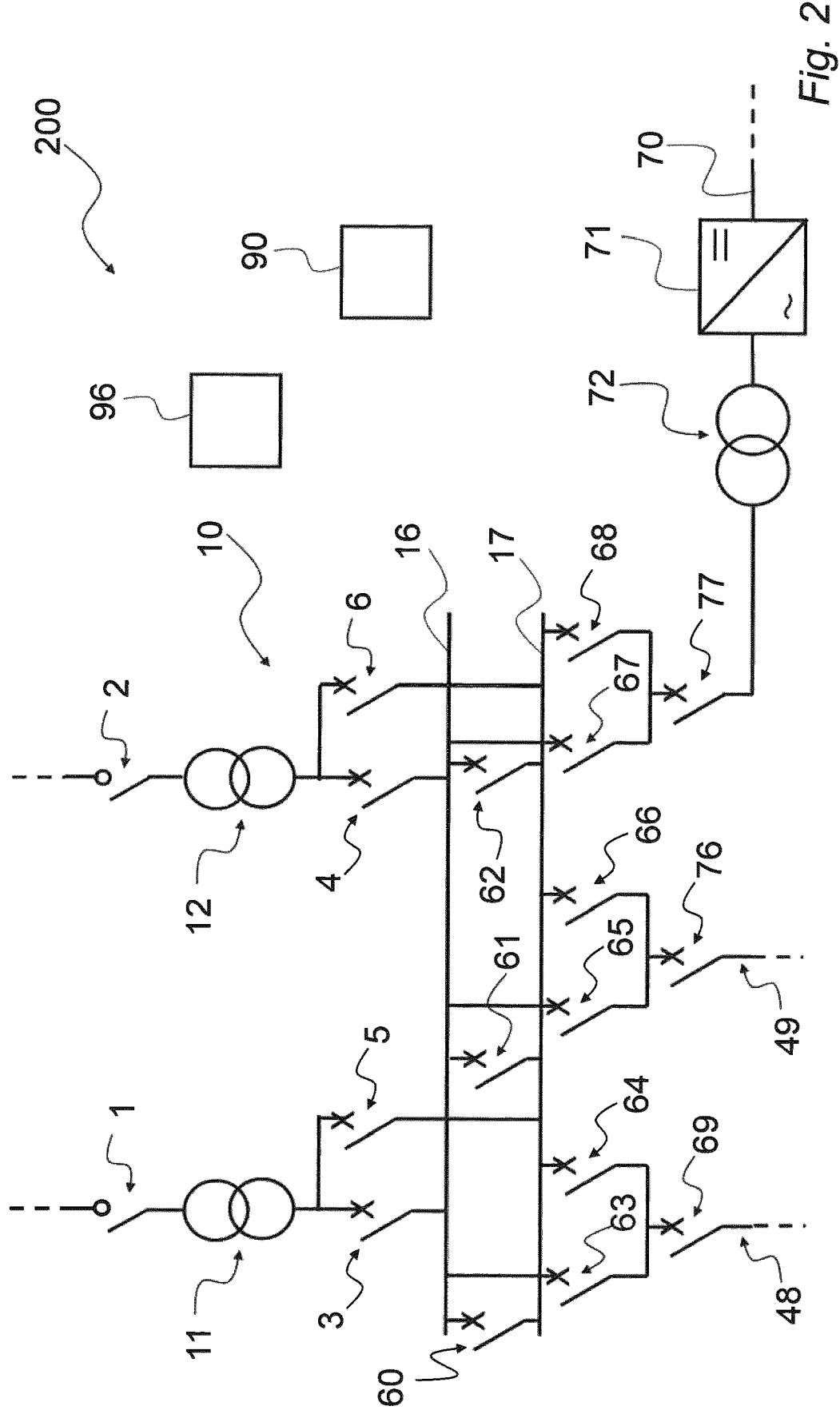

FIG. 2 is a schematic view of a power distribution arrangement 200 according to one or more embodiments. The power distribution arrangement 200 illustrated in FIG. 2 is in part similar to the power distribution arrangement 100 illustrated in FIG. 1, and the same reference numerals in FIG. 2 and in FIG. 1 denote the same or similar components, having the same or similar function.

Compared to the power distribution arrangement 100 illustrated in FIG. 1, the power distribution arrangement 200 illustrated in FIG. 2 comprises a different number of feeders, and has a different configuration of feeders, buses and switches. The principles of controlling of the operation of the switches in the power distribution arrangement 200 illustrated in FIG. 2 are similar to or the same as described with reference to the power distribution arrangement 100 illustrated in FIG. 1.

The power distribution arrangement 200 comprises feeders 48 and 49, switches 1-6, 60-69, 76 and 77, and buses 16 and 17. It is to be understood that the number of feeders may be larger than illustrated in FIG. 2, and that the number of switches and the number of buses may be smaller or larger than illustrated in FIG. 2.

Generally, each of the feeders is selectively and controllably connectable to at least one of the loads and to at least one of the transformers, respectively, via one or more of the buses of the power distribution arrangement, by means of at least some of the switches of the power distribution arrangement.

As illustrated in FIG. 2, each of the feeders 48 and 49 is selectively and controllably connectable to at least one of the loads and to at least one of the transformers 11, 12, respectively, via one or more of the buses 16, 17. The switches 3-6 and 60-66, 69 and 76 are configured to selectively and controllably connect or disconnect one or more of the feeders 48 and 49 to or from the one or more of the buses 16, 17 in order to connect or disconnect the one or more feeders 48, 49 to or from at least one of the transformers 11, 12.

For example, the switches 1, 2, 3, 6, 63, 65 and 69 may be normally-closed switches, and the switches 4, 5, 64 and 66 may be normally-open switches.

Generally, at least some of the feeders may be are selectively and controllably connectable to at least one of the transformers by means of a plurality of buses connected or connectable in parallel. The DC transmission line may be selectively and controllably connectable to at least one of the buses that are connected or connectable in parallel. In accordance with the embodiment illustrated in FIG. 2, each of the feeders 48, 49 is selectively and controllably connectable to at least one of the transformers 11, 12 by means of the buses 16, 17 connected or connectable in parallel. The DC transmission line 70 is selectively and controllably connectable to each of the buses 16, 17 that are connected or connectable in parallel. Each of the feeders 48 and 49 is selectively and controllably connectable to either the bus 16 or the bus 17. The DC transmission line 70 is also selectively and controllably connectable to either the bus 16 or the bus 17.

Figure 3:
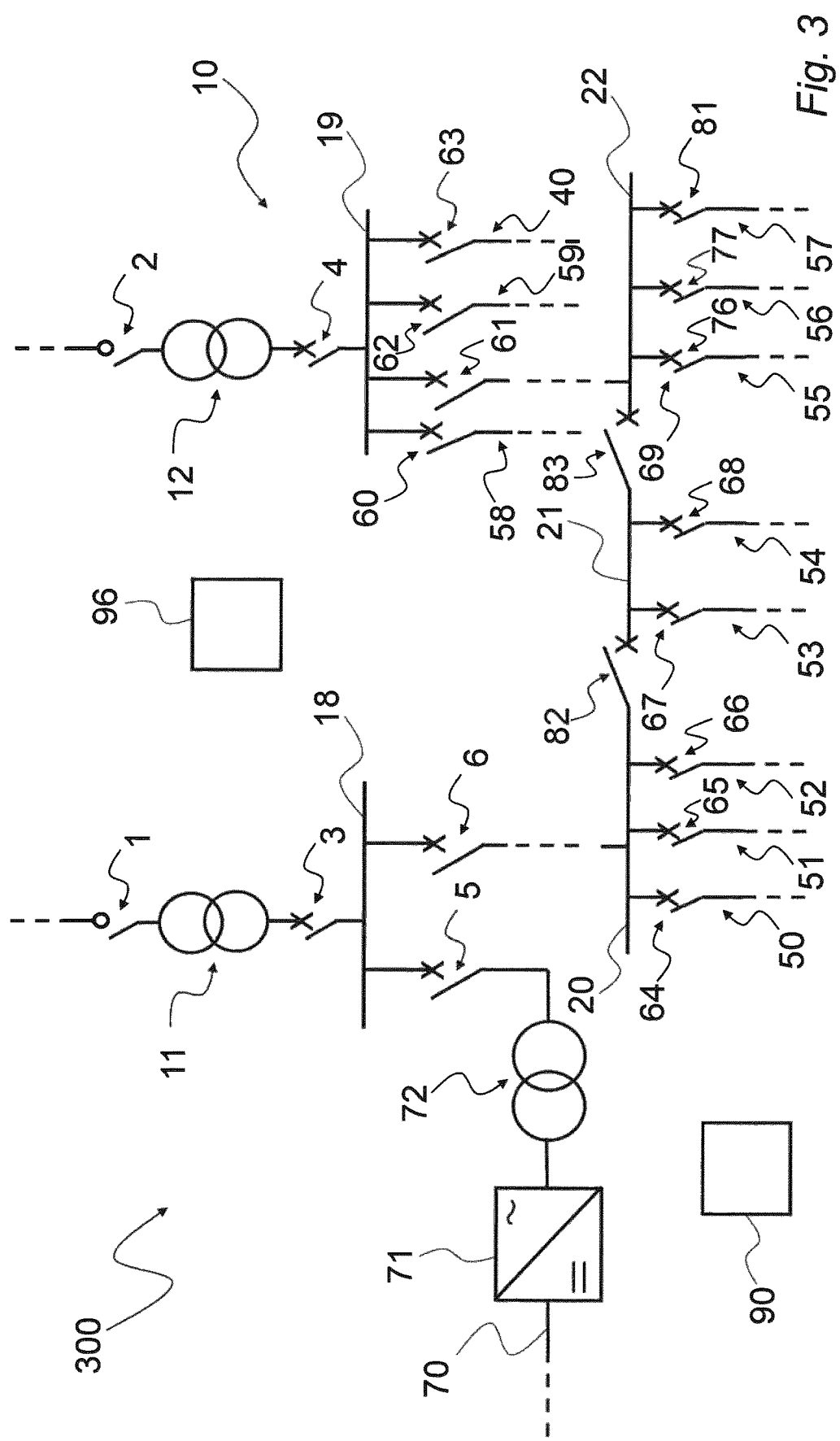

FIG. 3 is a schematic view of a power distribution arrangement 300 according to one or more embodiments. The power distribution arrangement 300 illustrated in FIG. 3 is in part similar to the power distribution arrangements 100 and 200 illustrated in FIGS. 1 and 2, respectively, and the same reference numerals in FIG. 3 and in FIGS. 1 and 2 denote the same or similar components, having the same or similar function.

Compared to the power distribution arrangements 100 and 200 illustrated in FIGS. 1 and 2, respectively, the power distribution arrangement 300 illustrated in FIG. 3 comprises a different number of feeders, and has a different configuration of feeders, buses and switches. The principles of controlling of the operation of the switches in the power distribution arrangement 300 illustrated in FIG. 3 are similar to or the same as described with reference to the power distribution arrangement 100 illustrated in FIG. 1.

The power distribution arrangement 300 comprises feeders 40 and 50-59, switches 1-6, 60-69, 76, 77, 81, 82 and 83, and buses 18-22. It is to be understood that the number of feeders, the number of switches, and the number of buses may be smaller or larger than illustrated in FIG. 3.

For example, the switches 1, 2, 3, 4 and 83 may be normally-closed switches, and the switch 82 may be a normally-open switch.

As illustrated in FIG. 3, the feeders 53 and 54 may be connected to either the transformer 11 or the transformer 12 or to both of the transformers 11 and 12, via the buses 18 and/or 19, depending on whether the respective ones of the switches 3, 4, 6, 61, 82 and 83 are open or closed.

In the power distribution arrangement 300 illustrated in FIG. 3, some of the illustrated switches are included in the power distribution substation 10, and the other of the illustrated switches are arranged remote from the power distribution substation 10. Specifically, the switches 64-69, 76, 77, 81, 82 and 83 are arranged remote from the power distribution substation 10, while the other ones of the illustrated switches are included in the power distribution substation 10. The switches 64-69, 76, 77, 81, 82 and 83 may be considered as being comprised in one or more so called (remote) switch houses, remote from the power distribution substation 10. In the power distribution arrangements 100 and 200 illustrated in FIGS. 1 and 2, respectively, the illustrated switches may all be considered to be included in the power distribution substation 10.

Figure 4:
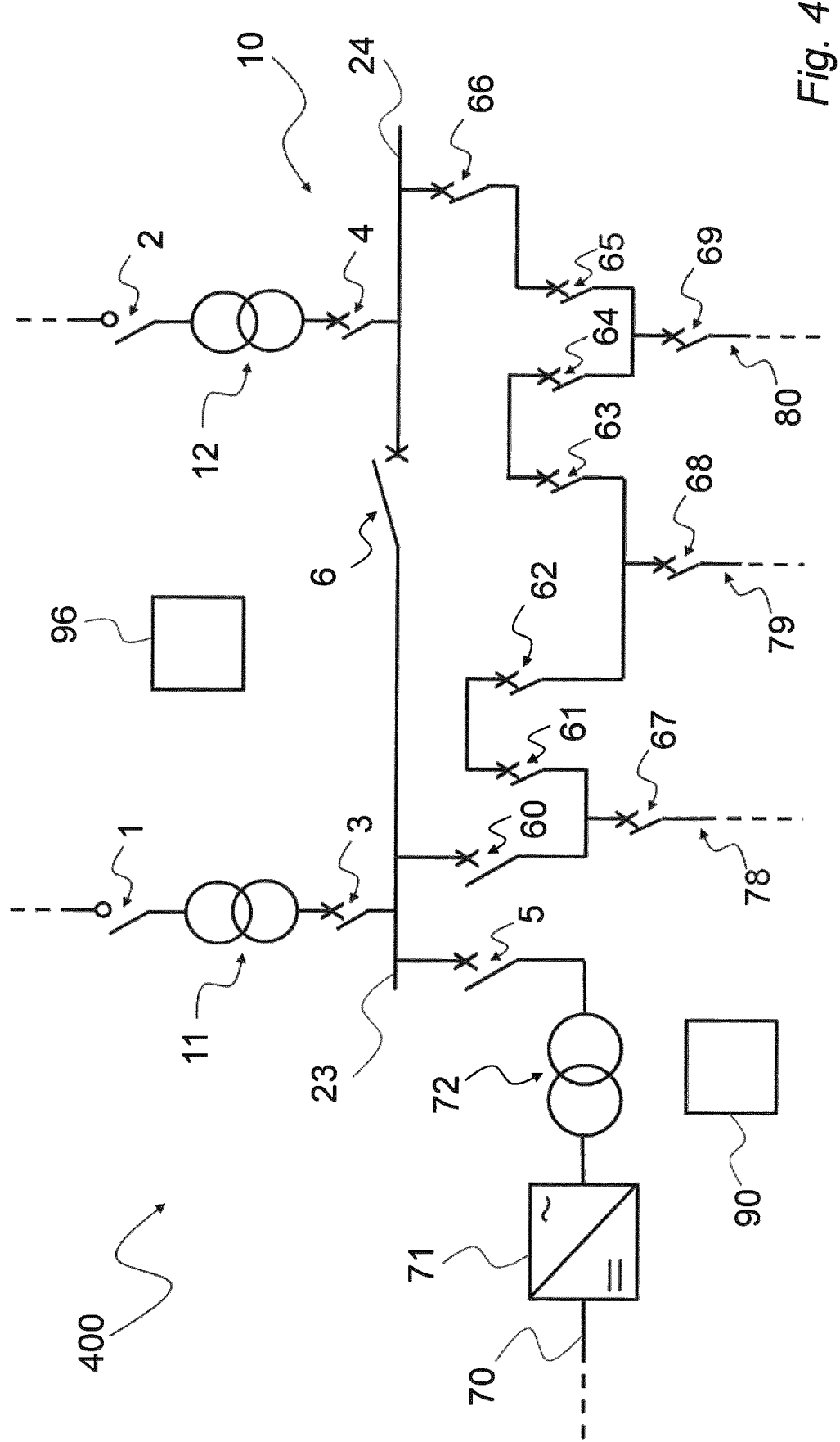

FIG. 4 is a schematic view of a power distribution arrangement 400 according to one or more embodiments. The power distribution arrangement 400 illustrated in FIG. 4 is in part similar to the power distribution arrangements 100, 200 and 300 illustrated in FIGS. 1, 2 and 3, respectively, and the same reference numerals in FIG. 4 and in FIGS. 1, 2 and 3 denote the same or similar components, having the same or similar function.

Compared to the power distribution arrangements 100, 200 and 300 illustrated in FIGS. 1, 2 and 3, respectively, the power distribution arrangement 400 illustrated in FIG. 4 comprises a different number of feeders, and has a different configuration of feeders, buses and switches. The principles of controlling of the operation of the switches in the power distribution arrangement 400 illustrated in FIG. 4 are similar to or the same as described with reference to the power distribution arrangement 100 illustrated in FIG. 1.

The power distribution arrangement 400 comprises feeders 78-80, switches 1-6 and 60-69, and buses 23 and 24. It is to be understood that the number of feeders, the number of switches and the number of buses may be smaller or larger than illustrated in FIG. 4.

As illustrated in FIG. 4, in the power distribution arrangement 400, the feeders 78-80 are selectively and controllably connectable to the transformers 11, 12 by means of a ring main distribution system.

For example, the switches 1-4, 60 and 62-66 may be normally-closed switches, and the switch 61 may be a normally-open switch.

As illustrated in FIG. 4, the feeders 78-80 may be connected to either the transformer 11 or the transformer 12 or to both of the transformers 11 and 12, via the buses 23 and/or 24, depending on whether the respective ones of the switches 3-6 and 60-66 are open or closed. Further, by changing a ring open point of the ring main distribution system, e.g., by opening or closing one or more of the switches 60-66, each of the feeders 78-80 may be connected to either the transformer 11 or the transformer 12.

Figure 5:
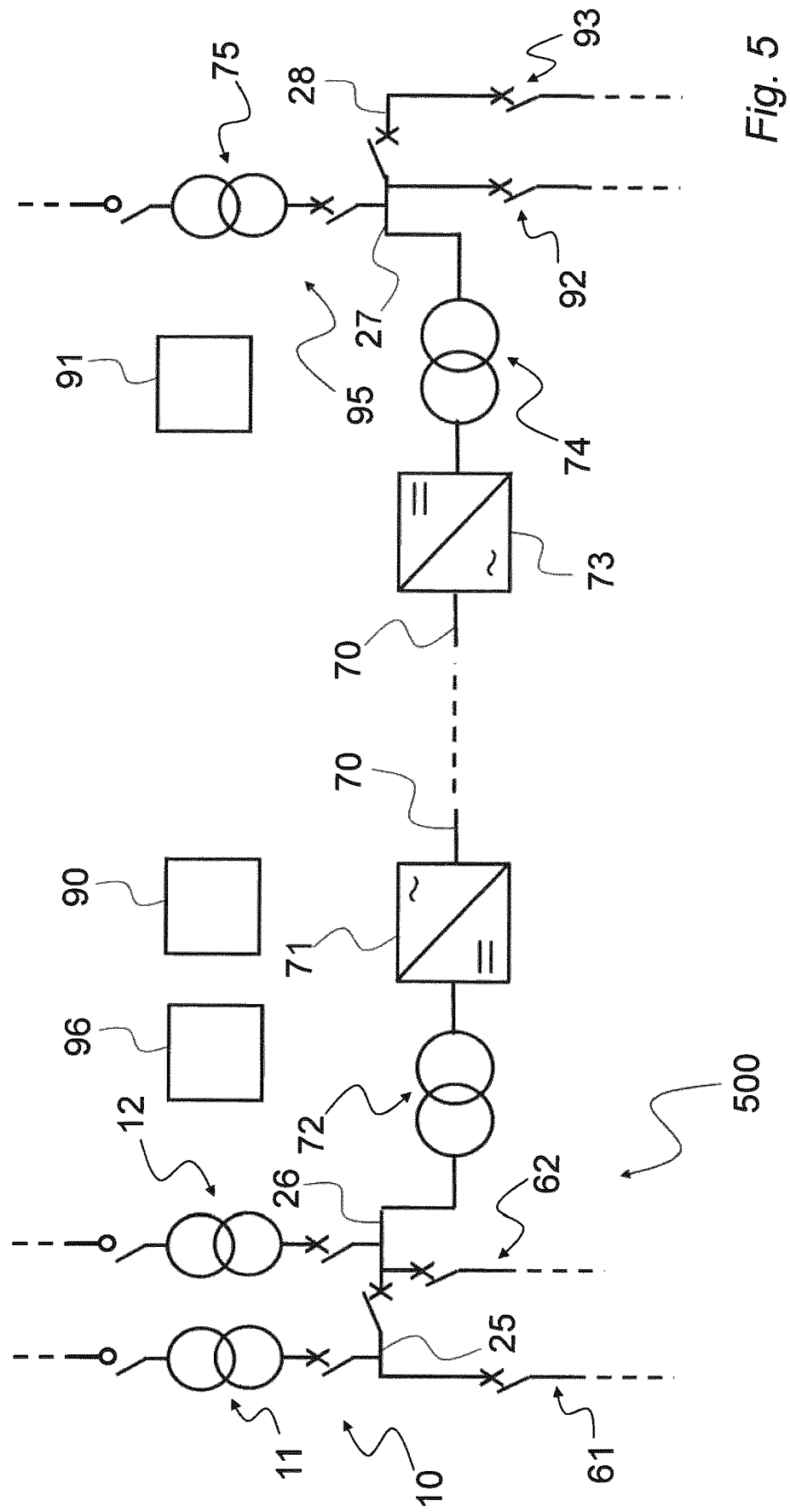

FIG. 5 is a schematic view of a power distribution arrangement 500 according to one or more embodiments. The power distribution arrangement 500 illustrated in FIG. 5 is in part similar to the power distribution arrangements 100, 200, 300 and 400 illustrated in FIGS. 1, 2, 3 and 4, respectively, and the same reference numerals in FIG. 5 and in FIGS. 1, 2, 3 and 4 denote the same or similar components, having the same or similar function.

Compared to the power distribution arrangements 100, 200, 300 and 400 illustrated in FIGS. 1, 2, 3 and 4, respectively, the power distribution arrangement 500 illustrated in FIG. 5 has a different configuration of feeders, buses and switches. The principles of controlling of the operation of the switches in the power distribution arrangement 500 illustrated in FIG. 5 are similar to or the same as described with reference to the power distribution arrangement 100 illustrated in FIG. 1.

The power distribution arrangement 500 comprises feeders 61 and 62 and buses 25 and 26. It is to be understood that the number of feeders may be larger than illustrated in FIG. 5, and that the number of buses may be smaller or larger than illustrated in FIG. 5. The switches of the power distribution arrangement 500 are not indicated by any reference numerals in FIG. 5. The number of switches of the power distribution arrangement 500 may be smaller or larger than illustrated in FIG. 5.

The power distribution arrangement 500 comprises a DC transmission line 70. The DC transmission line 70 is at one end thereof selectively and controllably connectable to the respective ones of the feeders 61, 62 via at least one bus, via a converter 71 configured to convert DC power to AC power, or vice versa. As illustrated in FIG. 5, in accordance with the illustrated embodiment, the DC transmission line 70 is at one end thereof selectively and controllably connectable to the feeders 61, 62 via the bus 26. The DC transmission line 70 may for example comprise or be constituted by an MVDC transmission line, which may be referred to as an MVDC link.

The DC transmission line 70 is the other end thereof connected or connectable to another substation 95, e.g., another power distribution substation.

The first control unit 90 may be configured to control any power transfer via the DC transmission line 70 from the at least one bus (e.g., the bus 26) to the power distribution substation 95. The first control unit 96 may be configured to control any power transfer via the DC transmission line 70 from the power distribution substation 95 to the at least one bus (e.g., the bus 26) based on a selected power transfer reference value, or power transfer setpoint. The second control unit 96 may be configured to control the operation of the switches of the power distribution arrangement 500 based on the power transfer reference value, and possibly also based on a power transfer rating of the DC transmission line 70.

The power distribution substation 95 comprises a transformer 75. However, similarly to the power distribution substation 10 of the power distribution arrangement 500, the power distribution substation 95 may comprise a plurality of transformers, even though only one transformer 75 of the power distribution substation 95 is shown in FIG. 5. Each of the transformers of the power distribution substation 95 may be selectively and controllably connectable to at least one power source providing AC power (not shown in FIG. 5).

Similarly to the power distribution arrangement 500, there may be provided a plurality of buses 27, 28 and a plurality of feeders 92, 93, which may be comprised in the power distribution substation 95 or at least be associated therewith.

It is to be understood that the number of feeders of or associated with the power distribution substation 95 may be larger than illustrated in FIG. 5, and that the number of switches and the number of buses of or associated with the other power distribution substation 95 may be smaller or larger than illustrated in FIG. 5. The switches of or associated with the power distribution substation 95 are not indicated by any reference numerals in FIG. 5.

Each of the feeders 92, 93 of or associated with the power distribution substation 95 may be selectively and controllably connectable to at least one load and to at least one of the transformers, respectively, via one or more of the buses 27, 28. There is a loading in and a power transfer rating of the respective ones of the feeders 92, 93, and a loading in and a power transfer rating of the respective ones of the transformers of the other power distribution substation 95.

The DC transmission line 70 is at the other end thereof (i.e. at the power distribution substation 95 end) selectively and controllably connectable to the respective ones of the feeders 92, 93, via at least one bus (e.g., the bus 27), via a converter 73 configured to convert DC power to AC power, or vice versa. Further in accordance with the illustrated embodiment, a transformer 74 is connected between the converter 73 and the bus 27. The transformer 74 may be omitted.

As illustrated in FIG. 5, there may be a control unit 91 associated with the other power distribution substation 95. The control unit 91 may be configured to control operation of the power distribution substation 95 and any components associated with the power distribution substation 95 (e.g., any feeders and switches associated with the power distribution substation 95). The first control unit 90 and/or the second control unit 96 may be communicatively connected with the control unit 91.

The principles of controlling of the operation of the switches of or associated with the power distribution substation 95 by the control unit 91 may or may not be similar to or the same as described with reference to the power distribution arrangement 100 illustrated in FIG. 1. Thus, the control unit 91 may or may not be configured to carry out such controlling that the first control unit 90 and/or the second control unit 96 is or are capable of and as described in the foregoing with reference to the power distribution arrangement 100 illustrated in FIG. 1.

As mentioned in the foregoing, the second control unit 96 may be configured to control the operation of the switches of the power distribution arrangement 500 based on the power transfer reference value. The second control unit 96 may be configured to receive an indication of the selected power transfer reference value from the control unit 91, possibly via the first control unit 90.

The first control unit 90 may be configured to determine possible power import and export ranges, for power transfer to the power distribution arrangement 500 from the other power distribution substation 95 and from the power distribution arrangement 500 to the other power distribution substation 95, respectively, based on the loading in and the power transfer rating of the respective ones of the feeders of the power distribution arrangement 500 and the feeders of or associated with the other power distribution substation 95 and the loading in and the power transfer rating of the respective ones of the transformers of the power distribution arrangement 500 and the transformers of the other power distribution substation 95. Thus, the possible power import and export ranges of the power distribution arrangement 500 may be determined taking into account the loading in and the power transfer rating of the transformers and feeders at both ends of the DC transmission line 70. The possible power import and export ranges determined by the first control unit 90 may be transmitted by the first control unit 90 to the second control unit 96. The second control unit 96 may be configured to control the operation of the switches of the power distribution arrangement 500 based on the possible power import and export ranges. Determining possible power import and export ranges and control of the operation of the switches of the power distribution arrangement based on the possible power import and export ranges as described above may be applied in any one of the embodiments disclosed herein.

Figure 6:
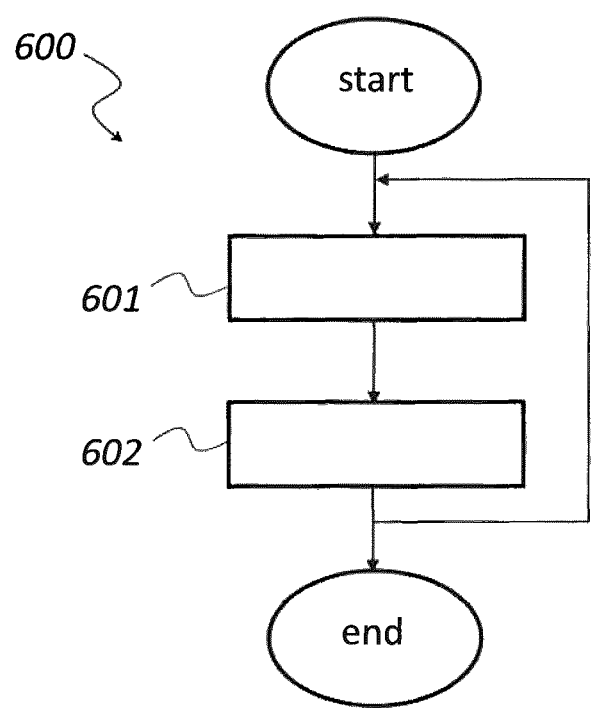
FIG. 6 is a flowchart illustrating a method in a power distribution arrangement according to one or more embodiments.

FIG. 6 is a flowchart illustrating a method 600 in a power distribution arrangement according to one or more embodiments. The method 600 is for distributing AC power to a plurality of loads requiring AC power. The power distribution arrangement comprises a power distribution substation comprising a plurality of transformers. Each of the transformers is selectively and controllably connectable to at least one power source providing AC power. The power distribution arrangement comprises a plurality of switches, a plurality of buses, and a plurality of feeders. Each of the feeders is selectively and controllably connectable to at least one of the loads and to at least one of the transformers, respectively, via one or more of the buses. At least some of the switches are configured to selectively and controllably connect or disconnect one or more of the feeders to or from the one or more of the buses in order to connect or disconnect the one or more feeders to or from at least one of the transformers. The power distribution arrangement comprises a DC transmission line. The DC transmission line is at one end thereof selectively and controllably connectable to the respective ones of the feeders via at least one bus, via a converter configured to convert DC power to AC power, or vice versa. The DC transmission line is at another (or the other) end thereof connected or connectable to another power distribution substation. At least one of the switches is configured to selectively and controllably connect or disconnect the DC transmission line to or from the at least one bus in order to connect or disconnect the DC transmission line to or from the feeders.

The method 600 comprises, at 601, controlling any power transfer via the DC transmission line from the other power distribution substation to the at least one bus.

At 602, operation of the switches is controlled to selectively connect or disconnect one or more of the feeders to or from at least one of the transformers via one or more of the buses and to selectively connect or disconnect the DC transmission line to or from one or more of the feeders via the at least one bus. Thereby, AC power is distributed to the loads via the feeders.

The controlling of the operation of the switches is based on: loading in and a power transfer rating of the respective ones of the feeders, loading in and a power transfer rating of the respective ones of the transformers, and any power transfer via the DC transmission line from the other power distribution substation to the at least one bus.

The method 600 may then end.

The method 600 may however not end, and the step 602 and possibly also the step 601 may be carried out repeatedly, e.g., over a period of time, as indicated by the line immediately before "end" going back to immediately after "start". Accordingly, the method 600 may comprise or constitute a control loop for controlling any power transfer via the DC transmission line from the other power distribution substation to the at least one bus and for controlling operation of the switches, e.g., over a period of time. The method 600 may for example be initiated by an operator, or based on occurrence of a predefined type of event, such as, for example, that it is sensed that a fault is occurring in the DC transmission line, and/or that it is sensed that there is an overload in one or more of the transformers (e.g., if the loading in one or more of the transformers exceed the power transfer ratings of the respective ones of that or those transformers).

In conclusion, a power distribution arrangement for distributing AC power to a plurality of loads requiring AC power is disclosed. The power distribution arrangement comprises a power distribution substation comprising a plurality of transformers, each of the transformers being selectively and controllably connectable to at least one power source providing AC power. The power distribution arrangement comprises a plurality of switches, a plurality of buses, and a plurality of feeders. Each of the feeders is selectively and controllably connectable to at least one of the loads and to at least one of the transformers, respectively, via one or more of the buses, by means of at least some of the switches. The power distribution arrangement comprises a DC transmission line, which at one end is selectively and controllably connectable to the respective ones of the feeders via at least one bus, by means of at least one of the switches, and at another end thereof is connected or connectable to another power distribution substation. The power distribution arrangement comprises at least one control unit configured to control any power transfer via the DC transmission line from the other power distribution substation to the at least one bus. The at least one control unit is configured to control operation of the switches in order to selectively connect or disconnect one or more of the feeders to or from at least one of the transformers via one or more of the buses and to selectively connect or disconnect the DC transmission line to or from one or more of the feeders via the at least one bus, whereby AC power is distributed to the loads via the feeders. The at least one control unit is configured to control the operation of the switches based on: loading in and a power transfer rating of the respective ones of the feeders, loading in and a power transfer rating of the respective ones of the transformers, and any power transfer via the DC transmission line from the other power distribution substation to the at least one bus.

While embodiments have been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed inventions, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A power distribution arrangement for distributing alternating current (AC) power to a plurality of loads requiring AC power, the power distribution arrangement comprising:
   a power distribution substation comprising a plurality of transformers each of the transformers being selectively and controllably connectable to at least one power source providing AC power;
   a plurality of switches;
   a plurality of buses;
   a plurality of feeders, each of which is selectively and controllably connectable to at least one of the loads and to at least one of the transformers, respectively, via one or more of the buses, wherein at least some of the switches are configured to selectively and controllably connect or disconnect one or more of the feeders to or from the one or more of the buses in order to connect or disconnect the one or more feeders to or from at least one of the transformers;
   a direct current (DC) transmission line, which at one end thereof is selectively and controllably connectable to the respective ones of the feeders via at least one bus, via a converter configured to convert DC power to AC power, or vice versa, and at another end thereof is connected or connectable to another power distribution substation, wherein at least one of the switches is configured to selectively and controllably connect or disconnect the DC transmission line to or from the at least one bus in order to connect or disconnect the DC transmission line to or from the feeders; and
   at least one control unit configured to control any power transfer via the DC transmission line from the other power distribution substation to the at least one bus;
   the at least one control unit being configured to control operation of the switches in order to selectively connect or disconnect one or more of the feeders to or from at least one of the transformers via one or more of the buses and to selectively connect or disconnect the DC transmission line to or from one or more of the feeders via the at least one bus, whereby AC power is distributed to the loads via the feeders, wherein the at least one control unit is configured to control the operation of the switches based on: loading in and a power transfer rating of the respective ones of the feeders, loading in and a power transfer rating of the respective ones of the transformers, and any power transfer via the DC transmission line from the other power distribution substation to the at least one bus.

2. A power distribution arrangement according to claim 1, wherein the at least one control unit is configured to control the operation of the switches such that loading in the respective ones of the transformers becomes more balanced between the transformers.

3. A power distribution arrangement according to claim 2, wherein the at least one control unit is configured to compare loadings in the feeders with the power transfer ratings of the respective ones of the feeders, and further to compare loadings in the transformers with the power transfer ratings of the respective ones of the transformers, and further to control the operation of the switches based on the comparisons such that loading in the respective ones of the transformers becomes more balanced between the transformers.

4. A power distribution arrangement according to claim 2, wherein the at least one control unit is configured to control any power transfer via the DC transmission line from the other power distribution substation to the at least one bus based on a selected power transfer reference value, and wherein the least one control unit is configured to control the operation of the switches further based on the power transfer reference value.

5. A power distribution arrangement according to claim 1, wherein the at least one control unit is configured to compare loadings in the feeders with the power transfer ratings of the respective ones of the feeders, and further to compare loadings in the transformers with the power transfer ratings of the respective ones of the transformers, and further to control the operation of the switches based on the comparisons such that loading in the respective ones of the transformers becomes more balanced between the transformers.

6. A power distribution arrangement according to claim 5, wherein the at least one control unit is configured to control any power transfer via the DC transmission line from the other power distribution substation to the at least one bus based on a selected power transfer reference value, and wherein the least one control unit is configured to control the operation of the switches further based on the power transfer reference value.

7. A power distribution arrangement according to claim 1, wherein the at least one control unit is configured to control any power transfer via the DC transmission line from the other power distribution substation to the at least one bus based on a selected power transfer reference value, and wherein the least one control unit is configured to control the operation of the switches further based on the power transfer reference value.

8. A power distribution arrangement according to claim 7, wherein the least one control unit is configured to control the operation of the switches further based on a power transfer rating of the DC transmission line.

9. A power distribution arrangement according to claim 7, wherein the at least one control unit is communicatively connected with another control unit associated with the other power distribution substation, and wherein the at least one control unit is configured to receive an indication of the selected power transfer reference value from the other control unit.

10. A power distribution arrangement according to claim 1, wherein the at least one control unit is configured to control the operation of the switches to selectively connect or disconnect the DC transmission line to or from one or more of the feeders via the at least one bus further based on an indication whether there is a fault occurring in the DC transmission line, wherein on a condition that there is a fault occurring in the DC transmission line, the at least one control unit is configured to disconnect the DC transmission line from the at least one bus, and wherein on a condition that there is no fault occurring in the DC transmission line, the at least one control unit is configured to selectively connect or disconnect the DC transmission line to or from one or more of the feeders via the at least one bus.

11. A power distribution arrangement according to claim 1, wherein at least some of the feeders are selectively and controllably connectable to at least one of the transformers by means of a plurality of buses connected or connectable in series, and wherein the DC transmission line is selectively and controllably connectable to at least one of the buses that are connected or connectable in series.

12. A power distribution arrangement according to claim 1, wherein at least some of the feeders are selectively and controllably connectable to at least one of the transformers by means of a plurality of buses connected or connectable in parallel, and wherein the DC transmission line is selectively and controllably connectable to at least one of the buses that are connected or connectable in parallel.

13. A power distribution arrangement according to claim 1, wherein at least some of the feeders are selectively and controllably connectable to the transformers by means of a ring main distribution system.

14. A power distribution arrangement according to claim 1, wherein:
the plurality of switches are all included in the power distribution substation; or
some of the plurality of switches are included in the power distribution substation, and the other(s) of the plurality of switches is or are arranged remote from the power distribution substation.

15. A power distribution arrangement according to claim 1, wherein if the loading in one or more of the transformers exceed the power transfer ratings of the respective ones of that or those transformers, such that that or those transformers are overloaded, the at least one control unit is configured to control the operation of the switches so as to disconnect one or more of the feeders from the overloaded transformer(s) via one or more of the buses and connect that or those feeders to one or more transformers that are not overloaded via one or more of the buses and/or connecting the DC transmission line to that or those feeders via the at least one bus.

16. A power distribution arrangement according to claim 1, wherein the at least one control unit is further configured to control any power transfer via the DC transmission line from the at least one bus to the other power distribution substation; and
wherein the at least one control unit is configured to determine, based on the loading in and the power transfer rating of the respective ones of the feeders and the loading in and the power transfer rating of the respective ones of the transformers, whether there is a deficit in available power from the transformers, so that there is need for power to be transferred via the DC transmission line from the other power distribution substation to the at least one bus, or if there is a surplus in available power from the transformers, so that power can be transferred via the DC transmission line from the at least one bus to the other power distribution substation; and wherein the at least one control unit is configured to, based on the deficit or the surplus in available power from the transformers, control transfer of power via the DC transmission line to transfer power from the other power distribution substation to the at least one bus or to transfer power from the at least one bus to the other power distribution substation.

17. A power distribution arrangement according to claim 1, wherein the at least one control unit is further configured to control any power transfer via the DC transmission line from the at least one bus to the other power distribution sub station;

wherein the other power distribution substation comprises a plurality of transformers, each of the transformers being selectively and controllably connectable to at least one power source providing AC power, a plurality of buses, and a plurality of feeders, each of which is selectively and controllably connectable to at least one load and to at least one of the transformers, respectively, via one or more of the buses, wherein the DC transmission line at the other end thereof is selectively and controllably connectable to the respective ones of the feeders, via at least one bus, via a converter configured to convert DC power to AC power, or vice versa, wherein there is a loading in and a power transfer rating of the respective ones of the feeders, a loading in and a power transfer rating of the respective ones of the transformers;

wherein the at least one control unit is configured to determine possible power import and export ranges, for power transfer to the power distribution arrangement from the other power distribution substation and from the power distribution arrangement to the other power distribution substation, respectively, based on the loading in and the power transfer rating of the respective ones of the feeders and the loading in and the power transfer rating of the respective ones of the transformers, at both ends of the DC transmission line.

18. A method in a power distribution arrangement for distributing alternating current (AC) power to a plurality of loads requiring AC power, the power distribution arrangement comprising a power distribution substation comprising a plurality of transformers, each of the transformers being selectively and controllably connectable to at least one power source providing AC power, the power distribution arrangement further comprising a plurality of switches, a plurality of buses and a plurality of feeders, each of the feeders being selectively and controllably connectable to at least one of the loads and to at least one of the transformers, respectively, via one or more of the buses, wherein at least some of the switches are configured to selectively and controllably connect or disconnect one or more of the feeders to or from the one or more of the buses in order to connect or disconnect the one or more feeders to or from at least one of the transformers, the power distribution arrangement further comprising a direct current (DC) transmission line, which at one end thereof is selectively and controllably connectable to the respective ones of the feeders, via at least one bus, via a converter configured to convert DC power to AC power, or vice versa, and at another end thereof is connected or connectable to another power distribution substation, wherein at least one of the switches is configured to selectively and controllably connect or disconnect the DC transmission line to or from the at least one bus in order to connect or disconnect the DC transmission line to or from the feeders, the method comprising:

controlling any power transfer via the DC transmission line from the other power distribution substation to the at least one bus; and controlling operation of the switches to selectively connect or disconnect one or more of the feeders to or from at least one of the transformers via one or more of the buses and to selectively connect or disconnect the DC transmission line to or from one or more of the feeders via the at least one bus, whereby AC power is distributed to the loads via the feeders;

wherein the controlling of the operation of the switches is based on: loading in and a power transfer rating of the respective ones of the feeders, loading in and a power transfer rating of the respective ones of the transformers, and any power transfer via the DC transmission line from the other power distribution substation to the at least one bus.

19. A control unit for a power distribution arrangement, the control unit comprising a processor configured to carry out the method of claim 18.

20. A non-transitory processor-readable medium, having a computer program loaded thereon, wherein the computer program comprises instructions, which, when executed by one or more processors comprised in at least one control unit, cause the at least one control unit to perform the method of claim 18.

* * * * *

UNITED STATES PATENT AND TRADEMARK OFFICE
CERTIFICATE OF CORRECTION

| | |
|---|---|
| PATENT NO. | : 11,777,312 B2 |
| APPLICATION NO. | : 18/020043 |
| DATED | : October 3, 2023 |
| INVENTOR(S) | : Ritwik Majumder |

It is certified that error appears in the above-identified patent and that said Letters Patent is hereby corrected as shown below:

On the Title Page

(71) Applicant should read: Hitachi Energy Ltd Zürich (CH)

Signed and Sealed this
Ninth Day of April, 2024

Katherine Kelly Vidal
*Director of the United States Patent and Trademark Office*